US009535286B2

(12) United States Patent
Sakurada

(10) Patent No.: US 9,535,286 B2
(45) Date of Patent: Jan. 3, 2017

(54) IMAGE DISPLAY DEVICE

(71) Applicant: Kabushiki Kaisha Toshiba, Tokyo (JP)

(72) Inventor: Hiroki Sakurada, Akishima (JP)

(73) Assignees: Kabushiki Kaisha Toshiba, Tokyo (JP); Toshiba Visual Solutions Corporation, Aomori (JP)

( * ) Notice: Subject to any disclaimer, the term of this patent is extended or adjusted under 35 U.S.C. 154(b) by 244 days.

(21) Appl. No.: 14/225,200

(22) Filed: Mar. 25, 2014

(65) Prior Publication Data

US 2015/0092394 A1 Apr. 2, 2015

(30) Foreign Application Priority Data

Sep. 30, 2013 (JP) ................................. 2013-203463

(51) Int. Cl.
*G02F 1/1335* (2006.01)
*G02F 1/1333* (2006.01)
*G02F 1/1345* (2006.01)

(52) U.S. Cl.
CPC ... *G02F 1/133608* (2013.01); *G02F 1/133308* (2013.01); *G02F 1/13452* (2013.01); *G02F 2001/133314* (2013.01); *G02F 2201/46* (2013.01)

(58) Field of Classification Search
CPC ................. G02F 1/133608; G02F 1/133308; G02B 6/0086–6/0091; G02B 7/20–7/24
See application file for complete search history.

(56) References Cited

U.S. PATENT DOCUMENTS

| 5,313,318 | A   | * | 5/1994  | Gruenberg et al. | 349/65     |
|-----------|-----|---|---------|------------------|------------|
| 6,342,932 | B1  | * | 1/2002  | Terao et al.     | 349/58     |
| 6,411,352 | B1  |   | 6/2002  | Kim              |            |
| 8,437,120 | B2  | * | 5/2013  | Lee et al.       | 361/679.01 |
| 8,988,867 | B2  | * | 3/2015  | Kuroda           | 361/679.21 |
| 9,013,887 | B2  | * | 4/2015  | Chou et al.      | 361/753    |
| 2002/0186333 | A1 | * | 12/2002 | Ha et al.      | 349/58     |
| 2005/0068261 | A1 | * | 3/2005  | Oh             | 345/60     |
| 2010/0188598 | A1 |   | 7/2010  | Suzuki         |            |
| 2012/0092584 | A1 |   | 4/2012  | Jung et al.    |            |
| 2013/0033658 | A1 |   | 2/2013  | Kato et al.    |            |

FOREIGN PATENT DOCUMENTS

JP 2010-175704 8/2010
JP 2013-130831 7/2013

OTHER PUBLICATIONS

European Application No./Patent No. 14158462.3; Extended European Search Report; Mailed Feb. 17, 2015.

* cited by examiner

*Primary Examiner* — Robert May
*Assistant Examiner* — Leah S Macchiarolo
(74) *Attorney, Agent, or Firm* — Rutan & Tucker, LLP

(57) ABSTRACT

According to one embodiment, an image display device includes a light-emitting module, a housing which includes a back chassis covering the light-emitting module from behind, and accommodates the light-emitting module, and a supporting member attached to an engagement hole formed in the back chassis and holding a circuit component on the back chassis. The supporting member includes a receiving portion which receives the circuit component, and a light-shielding portion configured to block off light of the light-emitting module passing through the engagement hole of the back chassis.

12 Claims, 18 Drawing Sheets

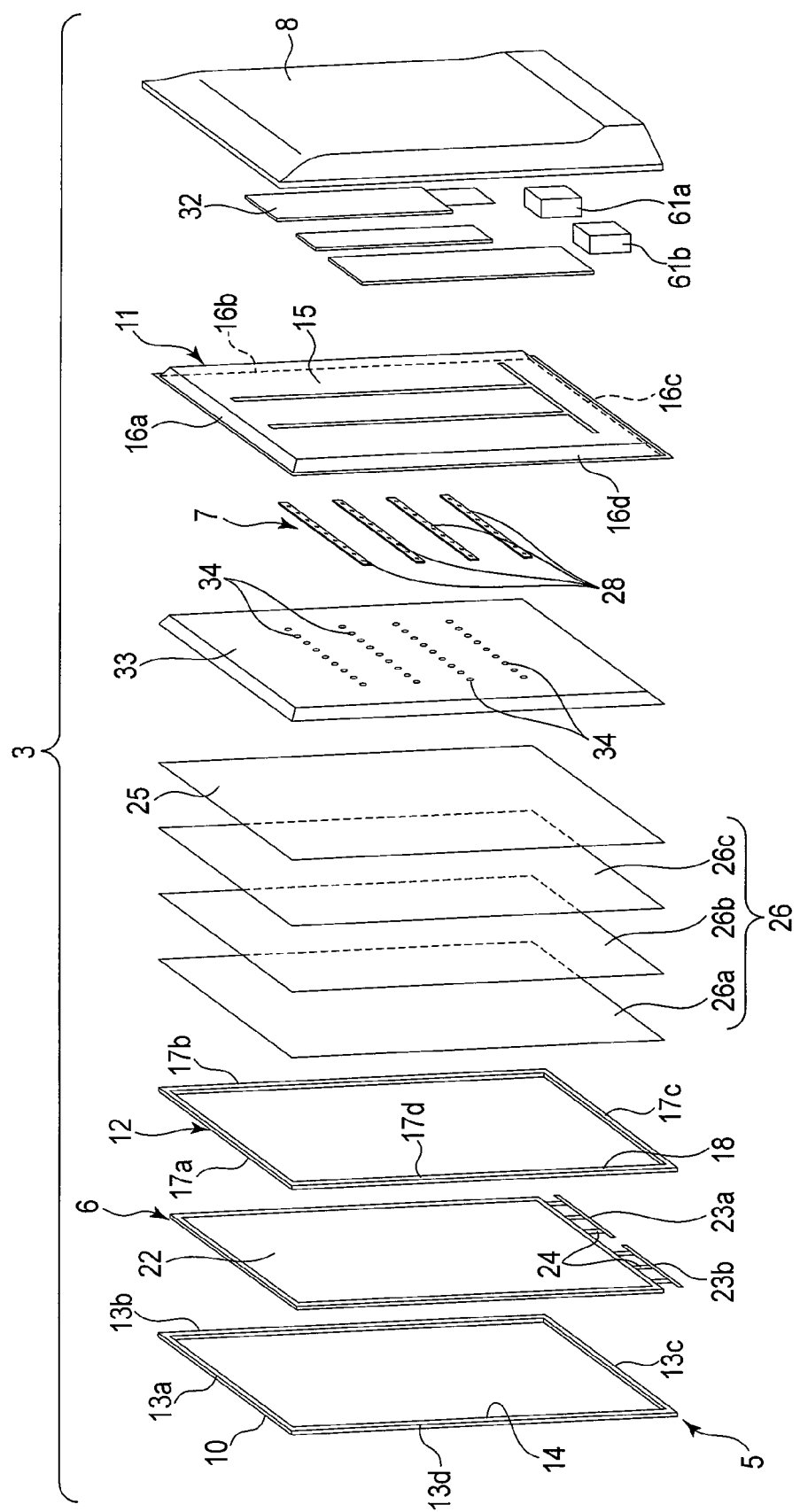
F I G. 3

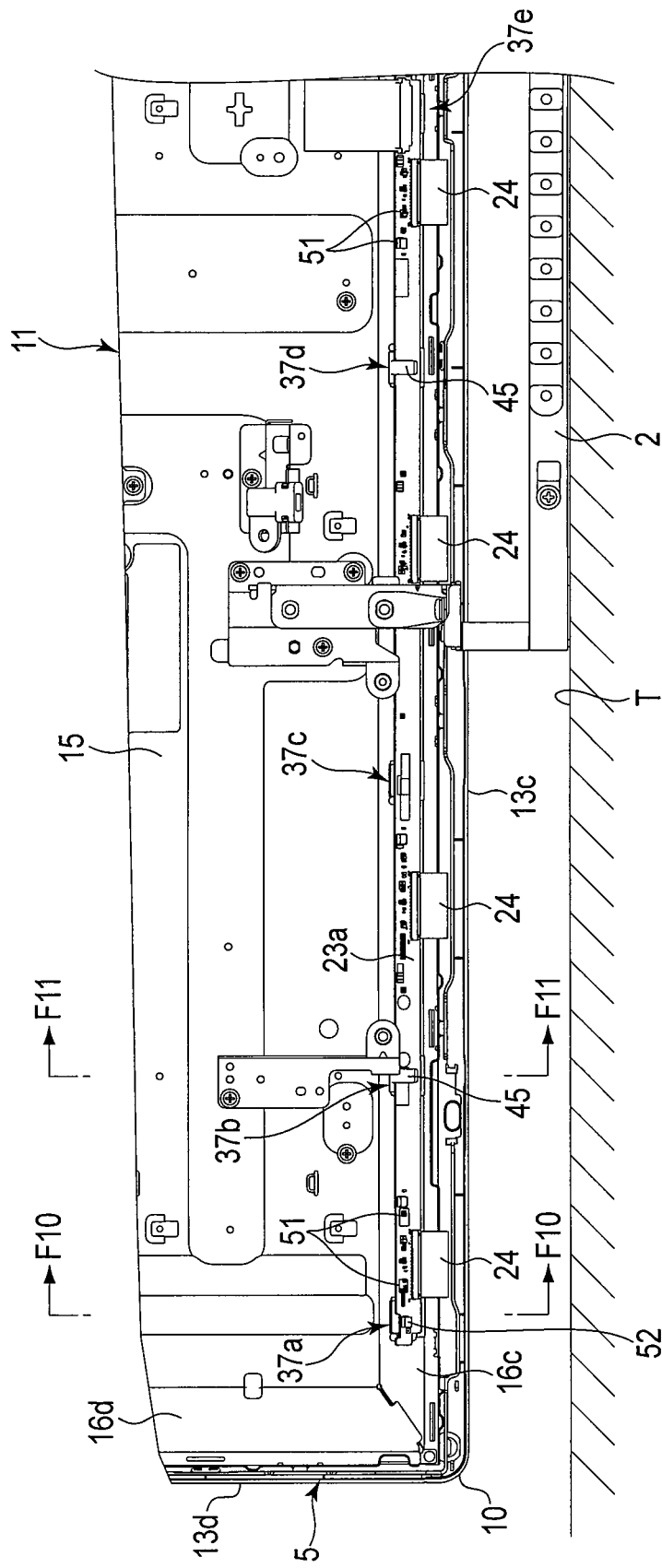
F I G. 9

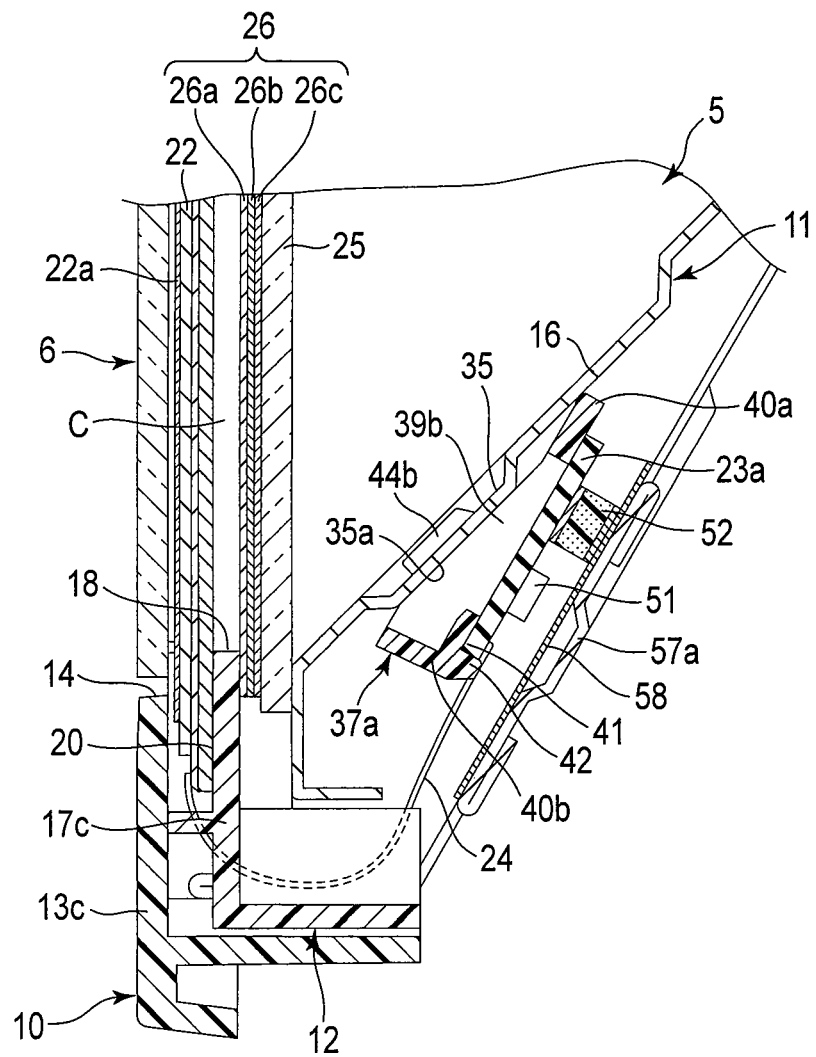
F I G. 10

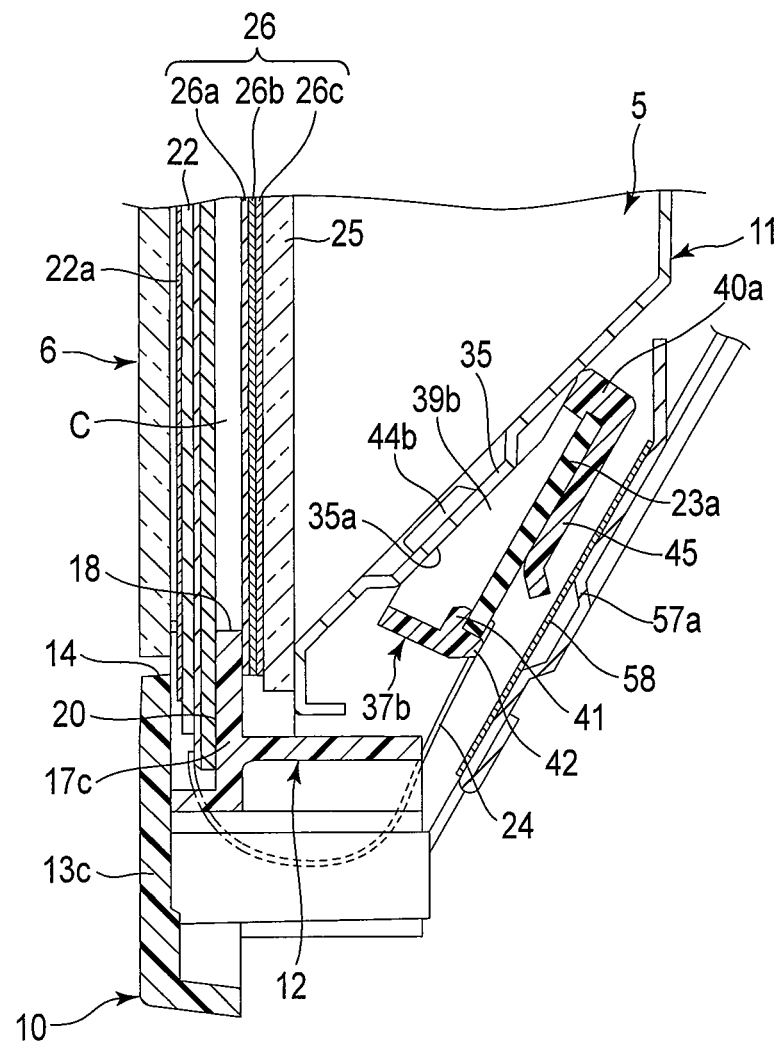
F I G. 11

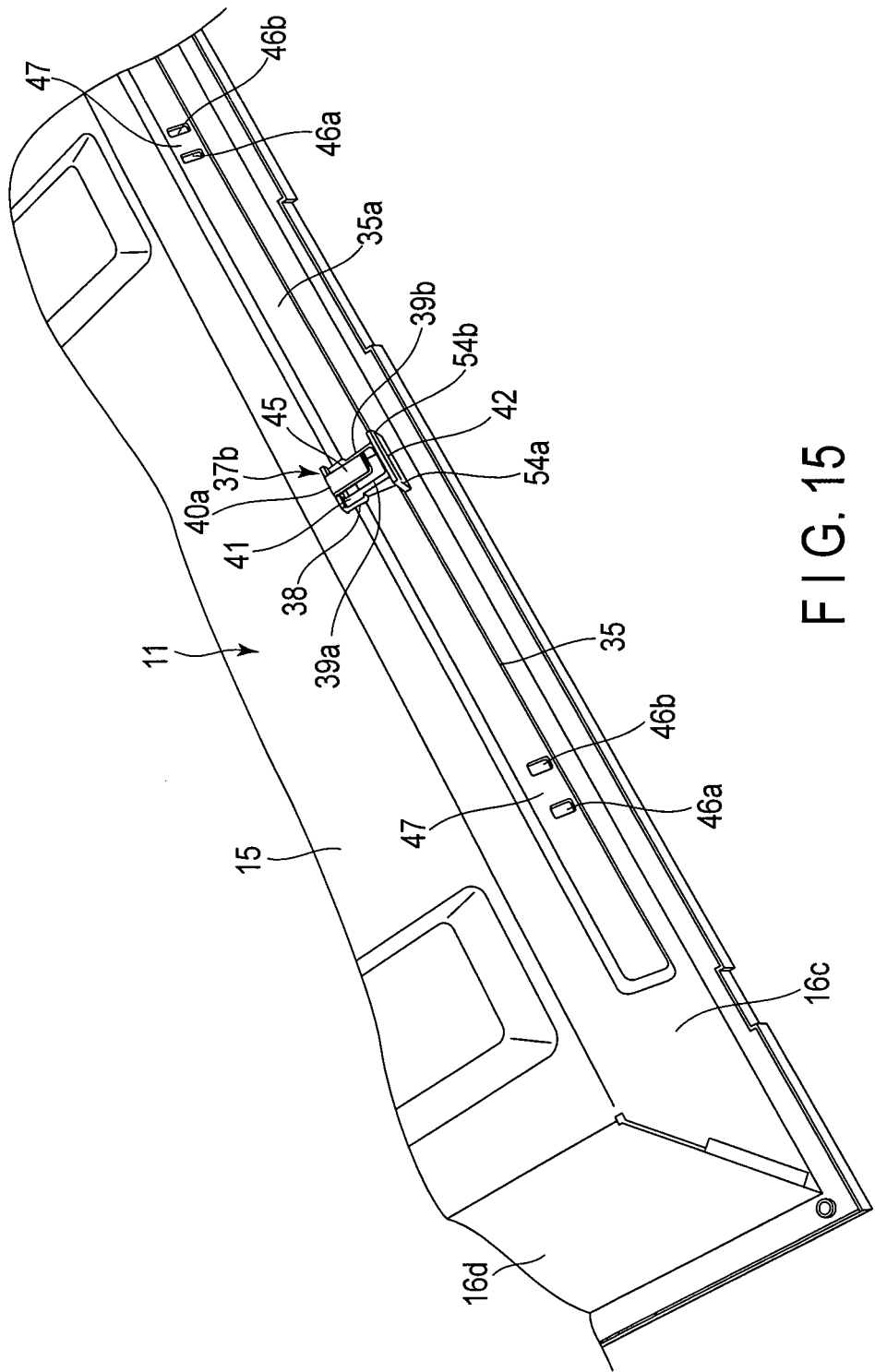
F I G. 15

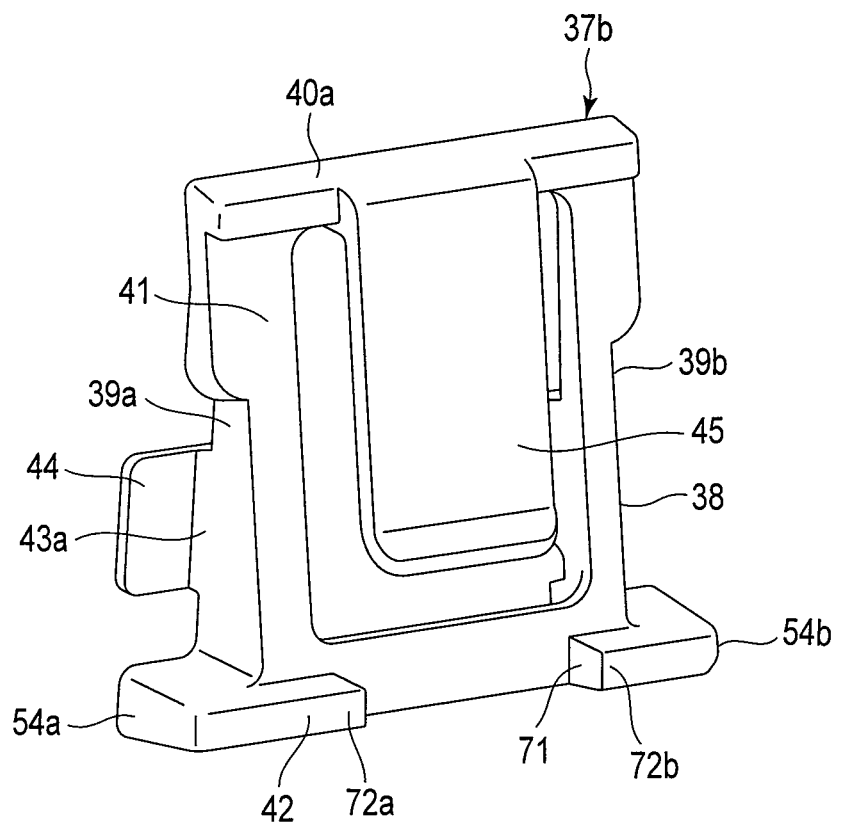
F I G. 20

IMAGE DISPLAY DEVICE

CROSS-REFERENCE TO RELATED APPLICATIONS

This application is based upon and claims the benefit of priority from Japanese Patent Application No. 2013-203463, filed Sep. 30, 2013, the entire contents of which are incorporated herein by reference.

FIELD

Embodiments described herein relate generally to an image display device.

BACKGROUND

In a liquid crystal display television, which is an example of an image display device, various peripheral components, such as a backlight for illuminating a liquid crystal cell and a printed-circuit board for driving the liquid crystal cell, are accommodated in a housing together with the liquid crystal cell. The printed-circuit board is held on a back chassis arranged behind the liquid crystal cell via a plurality of supporting members.

The supporting members are arranged on the back chassis by being hooked on a plurality of holes formed in the back chassis. When the holes are formed in the back chassis, some of the light emitted from the backlight, for example, leaks to the interior of the housing through the holes of the back chassis. The housing includes speaker apertures for emitting sound produced by speakers and air vents for discharging heat. Consequently, light leakage, in which the light leaked to the interior of the housing leaks outside the liquid crystal display television through the apertures or air vents of the housing, occurs.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary exploded perspective view showing a television main body of the liquid crystal display television;

FIG. 9 is an exemplary back view showing a state in which the printed-circuit board is held on the third outer peripheral wall of the back chassis via the first to fifth supporting members;

FIG. 10 is an exemplary cross sectional view taken along line F10-F10 of FIG. 9;

FIG. 11 is an exemplary cross sectional view taken along line F11-F11 of FIG. 9;

FIG. 15 is an exemplary perspective view showing the third outer peripheral wall of the back chassis in which engagement holes are formed;

FIG. 20 is an exemplary perspective view of a second supporting member to be used in a second embodiment.

DETAILED DESCRIPTION

Various embodiments will be described hereinafter with reference to the accompanying drawings. In general, according to one embodiment, an image display device comprises a light-emitting module, a housing comprising a back chassis covering the light-emitting module from behind and accommodating the light-emitting module, and a supporting member which is attached to an engagement hole formed in the back chassis and holds a circuit component on the back chassis. The supporting member comprises a receiving portion which receives the circuit component, and a light-shielding portion which is configured to block off light of the light-emitting module passing through the engagement hole in the back chassis.

First Embodiment

A first embodiment will now be described with reference to the drawings.

Figure 1:
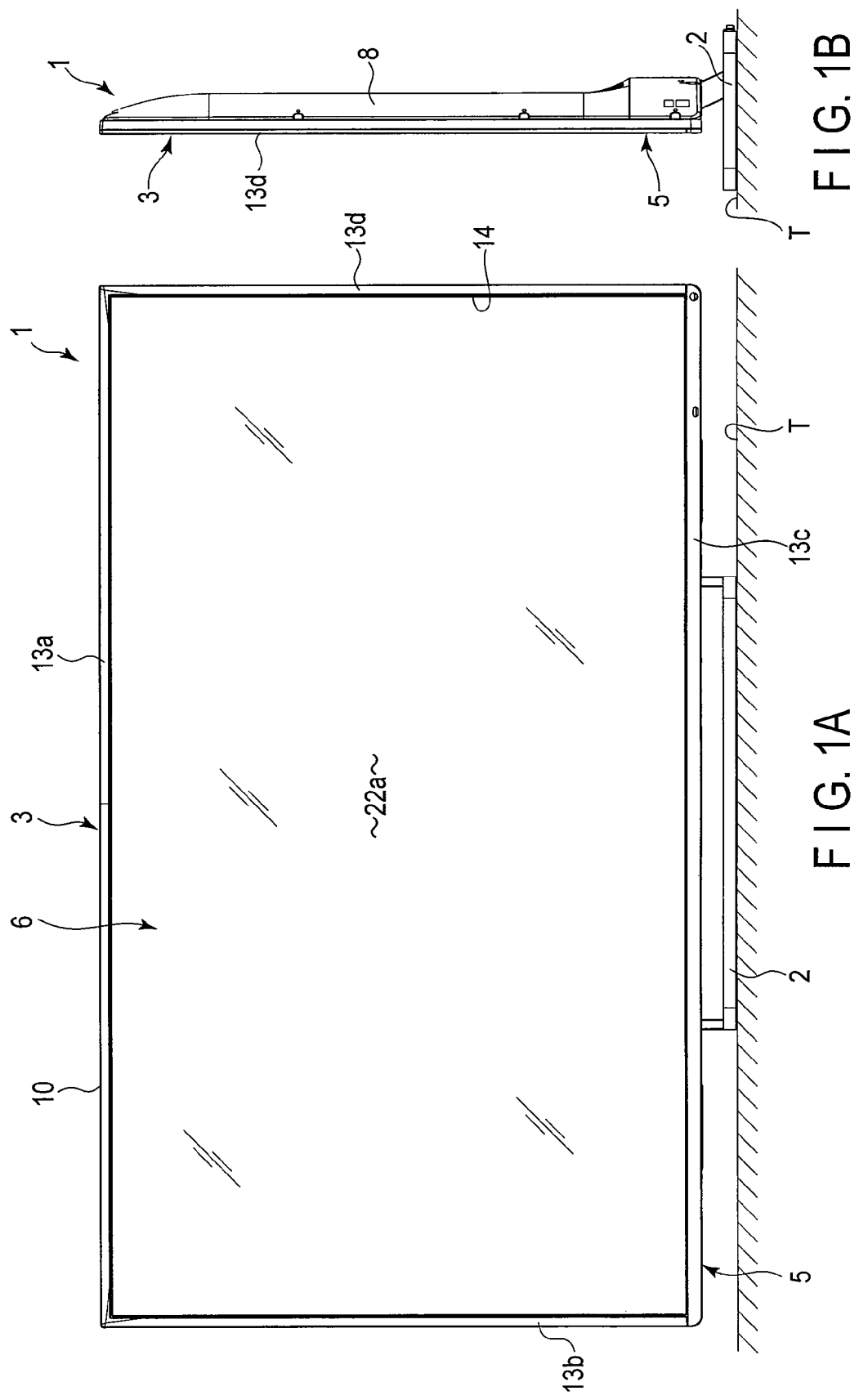
FIG. 1A is an exemplary front view of a liquid crystal display television.
FIG. 1B is an exemplary side view of the liquid crystal display television.
Figure 2:
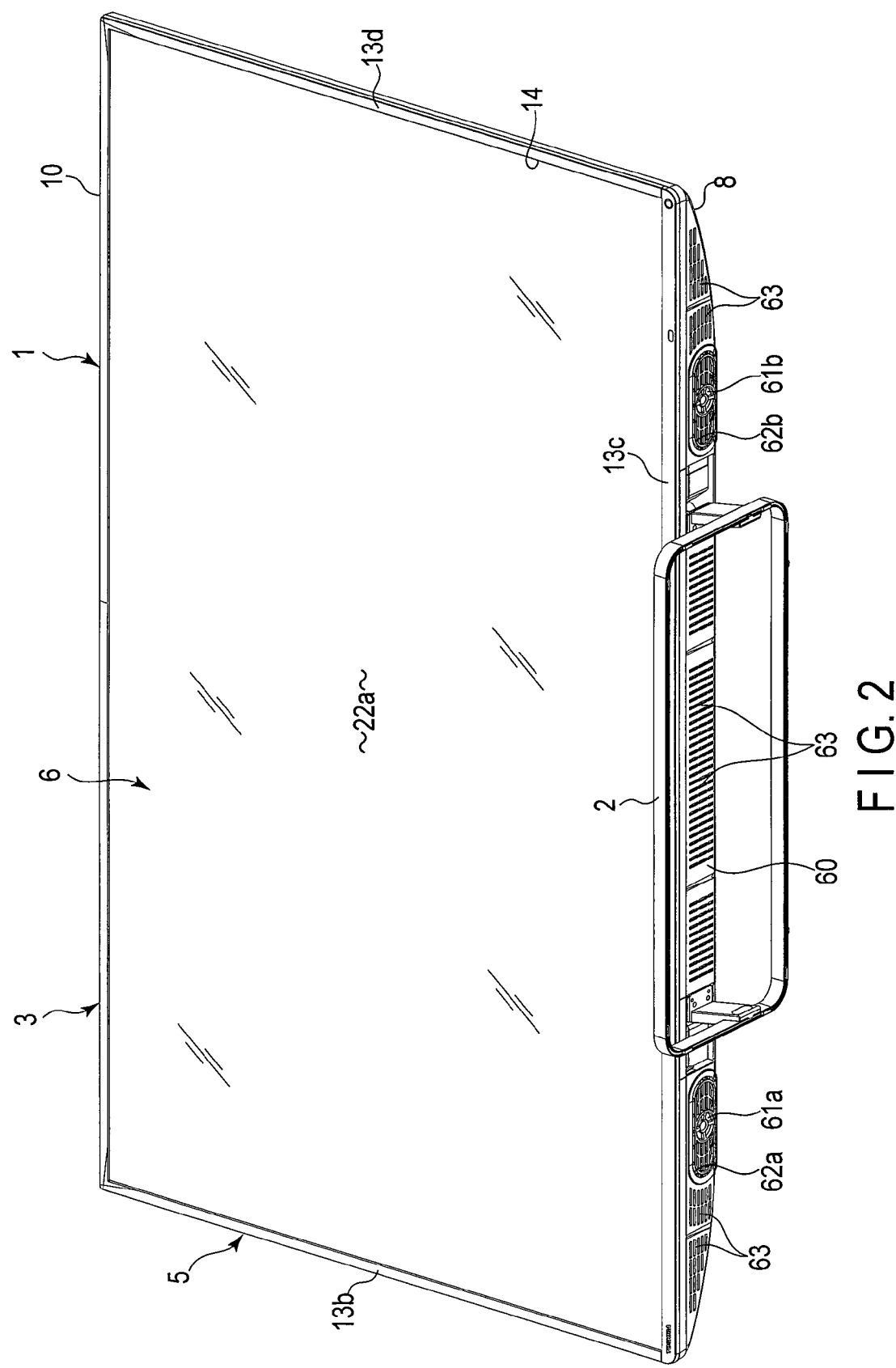
FIG. 2 is an exemplary perspective view of the liquid crystal display television when seen from a direction of a stand.

FIGS. 1A, 1B, and 2 disclose a liquid crystal display television 1 according to the first embodiment. The liquid crystal display television 1 is an example of a liquid crystal display device or an electronic device. The liquid crystal display television 1 comprises a stand 2 and a television main body 3. The stand 2 is arranged on top board T of a television plinth, for example. The television main body 3 is supported by the stand 2 such that it stands on top board T.

As shown in FIG. 3, the television main body 3 comprises a housing 5, a liquid crystal panel 6, a backlight 7, and a unit cover 8 as the main elements. The housing 5 includes a front bezel 10 made of resin, a metallic back chassis 11, and a middle frame 12 made of resin.

The front bezel 10 can be expressed in other words as a front cover or a first cover. The front bezel 10 is a horizontally long frame having first to fourth sides 13a, 13b, 13c, and 13d. The first side 13a and the third side 13c extend horizontally in a width direction of the television main body 3, and are spaced apart from each other in a height direction of the television main body 3 and arranged in parallel to each other. The second side 13b and the fourth side 13d rise in the height direction of the television main body 3, and are spaced apart from each other in the width direction of the television main body 3 and arranged in parallel to each other. The first to fourth sides 13a, 13b, 13c, and 13d define a rectangular opening 14 in cooperation with each other.

The back chassis 11 can be expressed in other words as a back cover or a second cover. The back chassis 11 is combined with the front bezel 10 such that it covers the font bezel 10 from the behind. The back chassis 11 comprises a back wall 15 and first to fourth outer peripheral walls 16a, 16b, 16c, and 16d.

The back wall 15 has a rectangular shape, and rises to face the opening 14 of the front bezel 10. At a lower end portion of a back surface of the back wall 15, the stand 2 is fixed. The first to fourth outer peripheral walls 16a, 16b, 16c, and 16d are oriented toward the front bezel 10 from an outer periphery of the back wall 15 and inclined to protrude around back wall 15. Front edge portions of the first to fourth outer peripheral walls 16a, 16b, 16c, and 16d are opposed to the first to fourth sides 13a, 13b, 13c, and 13d of the front bezel 10, respectively.

The middle frame 12 is a horizontally long frame having first to fourth sides 17a, 17b, 17c, and 17d. The first side 17a is positioned between the first side 13a of the front bezel 10 and the front edge portion of the first outer peripheral wall 16a of the back chassis 11. The second side 17b is positioned between the second side 13b of the front bezel 10 and the front edge portion of the second outer peripheral wall 16b of the back chassis 11. The third side 17c is positioned between the third side 13c of the front bezel 10 and the front edge portion of the third outer peripheral wall 16c of the back chassis 11. The fourth side 17d is positioned between the fourth side 13d of the front bezel 10 and the front edge portion of the fourth outer peripheral wall 16d of the back chassis 11. The first to fourth sides 17a, 17b, 17c, and 17d define a rectangular opening 18 in cooperation with each other.

Each of the first to fourth sides 17a, 17b, 17c, and 17d of the middle frame 12 includes a flat support surface 20 as shown in FIGS. 10 and 11. The flat support surfaces 20 of the first to fourth sides 17a, 17b, 17c, and 17d are contiguous along a periphery of the middle frame 12 to surround the opening 18. The support surfaces 20 of the first to fourth sides 17a, 17b, 17c, and 17d are located on the same plane as each other and opposed to the front bezel 10.

According to the present embodiment, the front bezel 10, the back chassis 11, and the middle frame 12 are coupled to each other via a plurality of metal clips or screws. Thus, the front bezel 10, the back chassis 11, and the middle frame 12 are assembled as an integrated construct and constitute the housing 5 which is flat and box-shaped.

The liquid crystal panel 6 is accommodated inside the housing 5. As shown in FIG. 3, the liquid crystal panel 6 comprises a rectangular liquid crystal cell 22, and two printed-circuit boards 23a and 23b equipped with a drive circuit for driving the liquid crystal cell 22. The liquid crystal cell 22 comprises a screen 22a for displaying an image. An outer peripheral portion of the liquid crystal cell 22 which is outside the screen 22a is sandwiched between the front bezel 10 and the support surfaces 20 of the middle frame 12. Accordingly, the screen 22a of the liquid crystal cell 22 is exposed outside the housing 5 through the opening 14.

The printed-circuit boards 23a and 23b are an example of circuit components, and have an elongated figure extending in a width direction of the liquid crystal cell 22. As shown in FIGS. 6 and 9 to 11, the printed-circuit boards 23a and 23b are connected to a lower end portion of the liquid crystal cell 22 via a plurality of flexible printed wiring boards 24. In the present embodiment, the flexible printed wiring boards 24 are folded back toward the back side of the liquid crystal cell 22. Thereby, the printed-circuit boards 23a and 23b are positioned on the back surface of the third outer peripheral wall 16c of the back chassis 11.

As shown in FIGS. 3, 10, and 11, a diffusion plate 25 is arranged behind the liquid crystal cell 22. The diffusion plate 25 is a rectangular plate having a size equal to the size of the liquid crystal cell 22, and has a light diffusion property and a light transmission property. The diffusion plate 25 is interposed between the front edge portions of the first to fourth outer peripheral walls 16a, 16b, 16c, and 16d of the back chassis 11 and the middle frame 12, and opposed to the opening 18 of the middle frame 12.

Further, an optical sheet 26 is stacked on a front surface of the diffusion plate 25. The optical sheet 26 includes, for example, three sheet elements 26a, 26b, and 26c, such as a prism sheet or a light diffusion sheet. The optical sheet 26 faces the back surface of the liquid crystal cell 22 in the housing 5. Between the optical sheet 26 and the back surface of the liquid crystal cell 22, small clearance C is secured.

Figure 4:
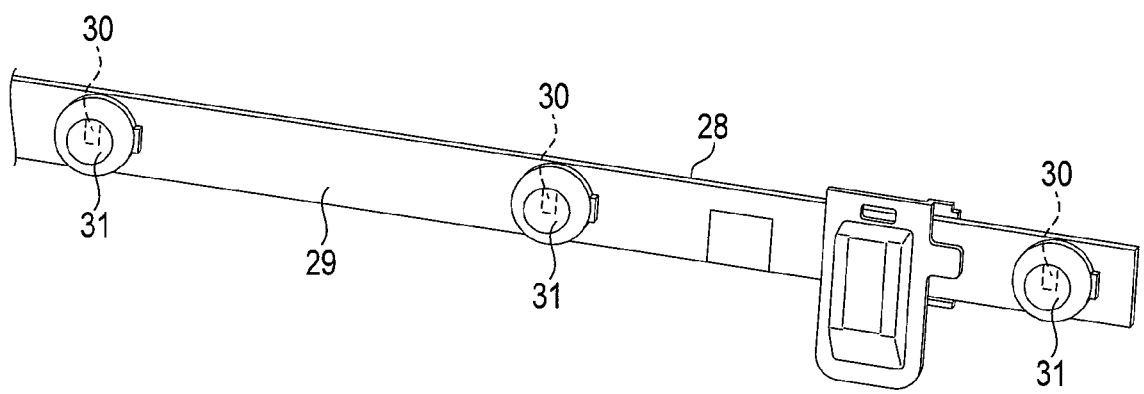
FIG. 4 is an exemplary perspective view showing a part of an LED module which constitutes a backlight.

The backlight 7 is accommodated in the housing 5. The backlight 7 is an example of a light source, and comprises a plurality of LED modules 28. As shown in FIG. 4, each of the LED modules 28 comprises a module board 29 and a plurality of LEDs 30. The module board 29 has an elongated shape extending in the width direction of the liquid crystal cell 22. The LEDs 30 are mounted on a front surface of the module board 29. The LEDs 30 are spaced apart from each other in a longitudinal direction of the module board 29 and aligned, and each of the LEDs 30 is covered by a lens 31.

The module board 29 is held on a front surface of the back wall 15 of the back chassis 11. The lenses 31 covering the LEDs 30 face the diffusion plate 25. According to the present embodiment, the plurality of LED modules 28 are spaced apart from each other in a height direction of the liquid crystal cell 22 and arranged in parallel to each other. Further, the LED modules 28 are electrically connected to a printed-wiring board 32 supported on the back surface of the back wall 15 of the back chassis 11.

As shown in FIG. 3, a white reflection sheet 33, for example, is stacked on the front of the back chassis 11. The reflection sheet 33 covers the front of the back chassis 11 and the module board 29 continuously. The lenses 31 covering the LEDs 30 pass through a plurality of through-holes 34 provided in the reflection sheet 33 to be exposed on the reflection sheet 33.

The reflection sheet 33 reflects the light incident on the back chassis 11 from the LEDs 30 onto the diffusion plate 25. The reflected light is directed to the diffusion plate 25 together with the light directly incident on the diffusion plate 25 from the LEDs 30. The light entering the diffusion plate 25 passes through the optical sheet 26 and impinges on the liquid crystal cell 22. Consequently, the light is irradiated onto the liquid crystal cell 22 from the front surface of the diffusion plate 25, and visibility of an image displayed on the screen 22a of the liquid crystal cell 22 is enhanced.

Therefore, in the present embodiment, the liquid crystal panel 6 and the backlight 7 constitute a light-emitting module accommodated in the housing 5.

Figure 6:
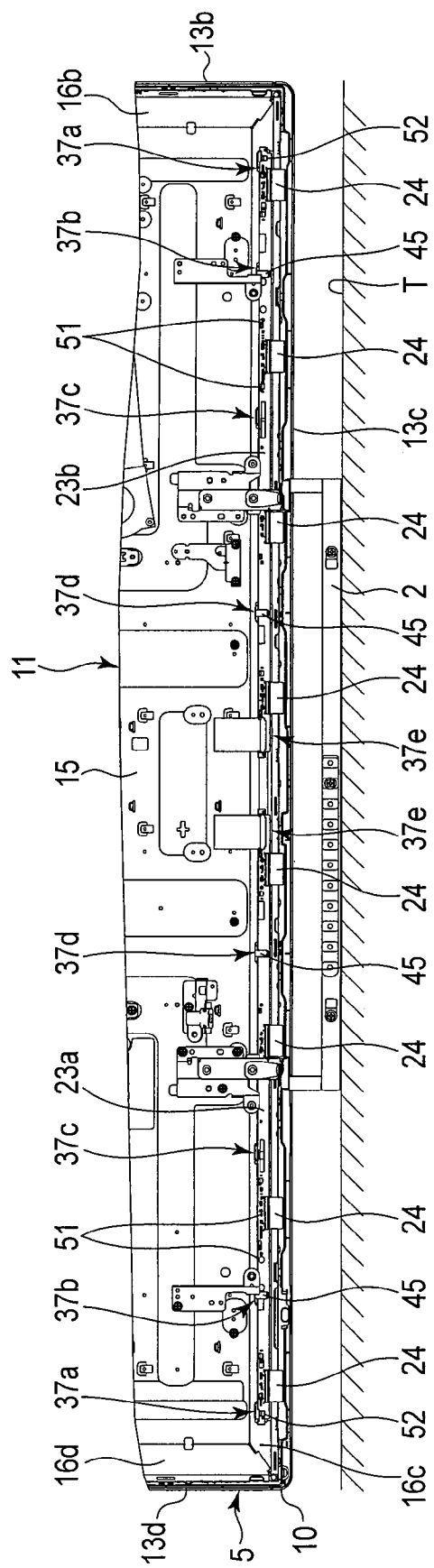
FIG. 6 is an exemplary back view of the back chassis holding a printed-circuit board which drives a liquid crystal cell.

As shown in FIG. 6, each of the printed-circuit boards 23a and 23b which drives the liquid crystal cell 22 is held on a back surface of the third outer peripheral wall 16c positioned at a lower end portion of the back chassis 11. The printed-circuit boards 23a and 23b are aligned in a width direction of the back chassis 11.

Since the structures for holding the printed-circuit boards 23a and 23b on the third outer peripheral wall 16c are common to each other, one of the printed-circuit boards, i.e., the printed-circuit board 23a, will be described as a typical example of the printed-circuit boards.

Figure 7:
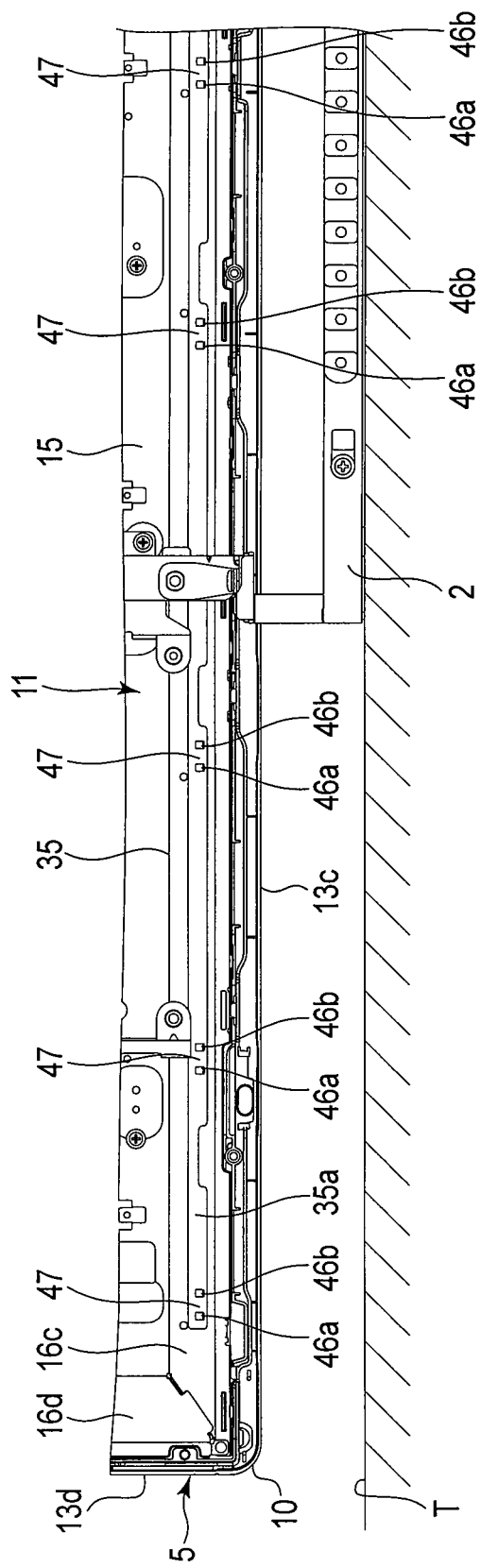
FIG. 7 is an exemplary back view of a third outer peripheral wall of the back chassis comprising a seat.
Figure 8:
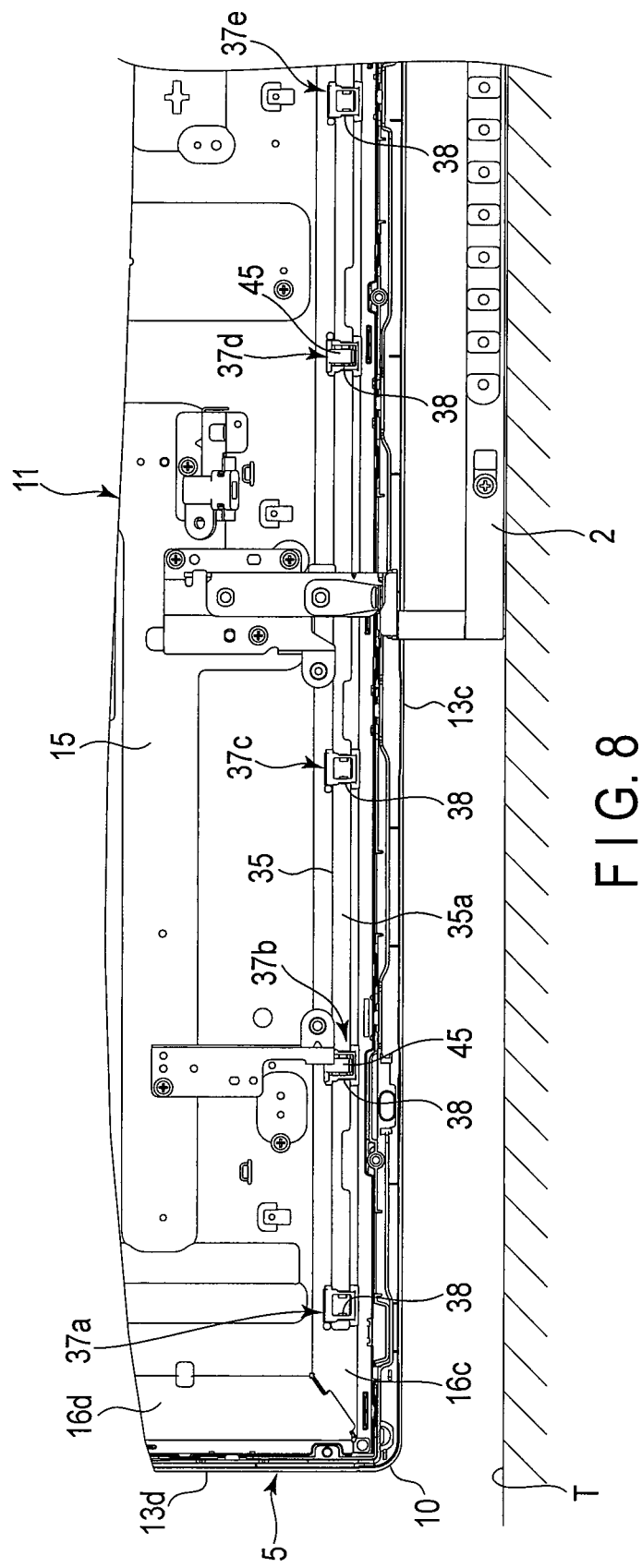
FIG. 8 is an exemplary back view showing a state in which first to fifth supporting members are arranged on the third outer peripheral wall of the back chassis.

As shown in FIGS. 7 and 15, a seat 35 is formed on the third outer peripheral wall 16c of the back chassis 11. The seat 35 protrudes downward from the third outer peripheral wall 16c and extends linearly in the width direction of the back chassis 11. The seat 35 includes a flat seating face 35a exposed at the back of the back chassis 11.

Figure 14:
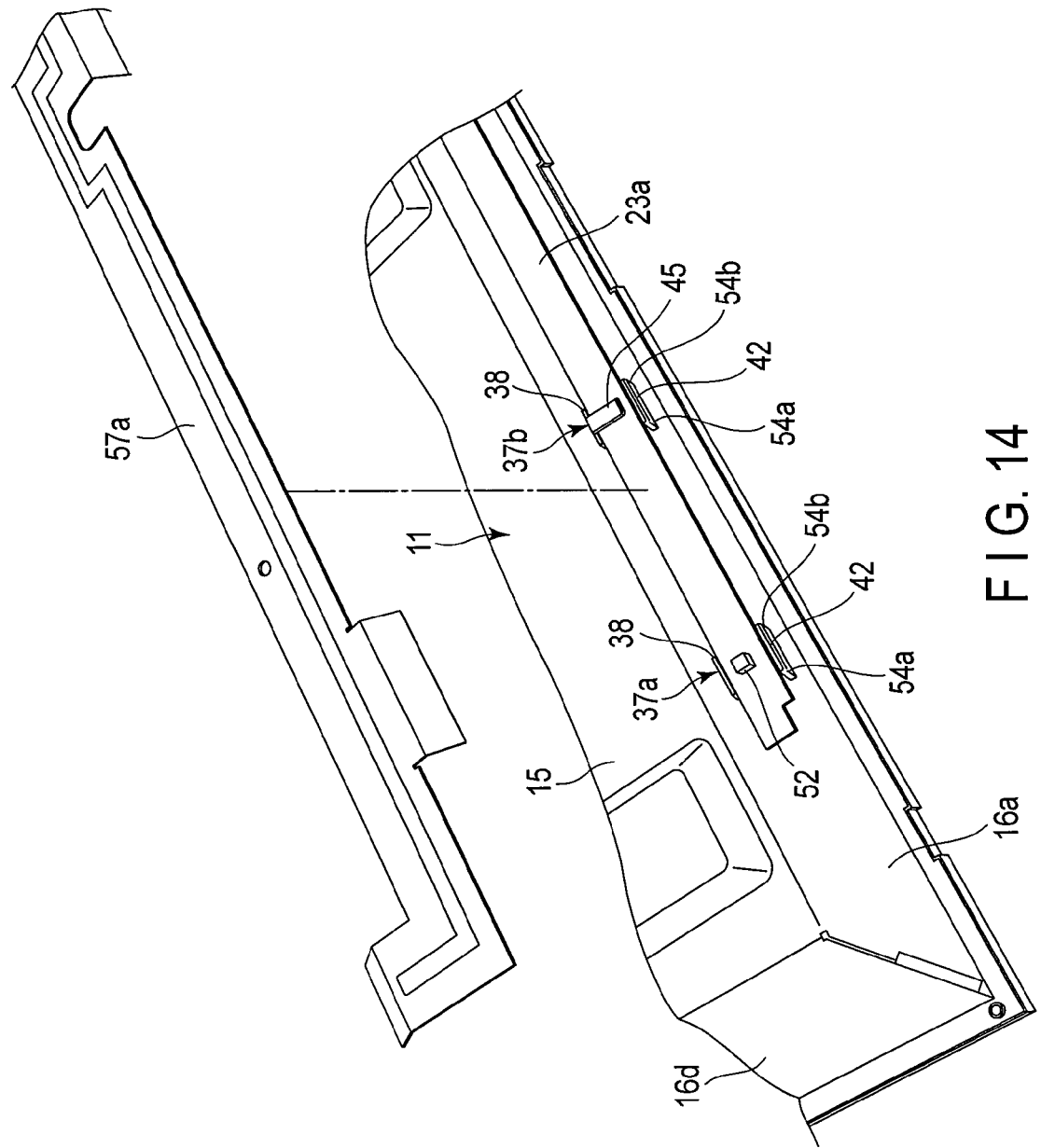
FIG. 14 is an exemplary perspective view showing a state in which the printed-circuit board is held on the third outer peripheral wall of the back chassis.
Figure 16:
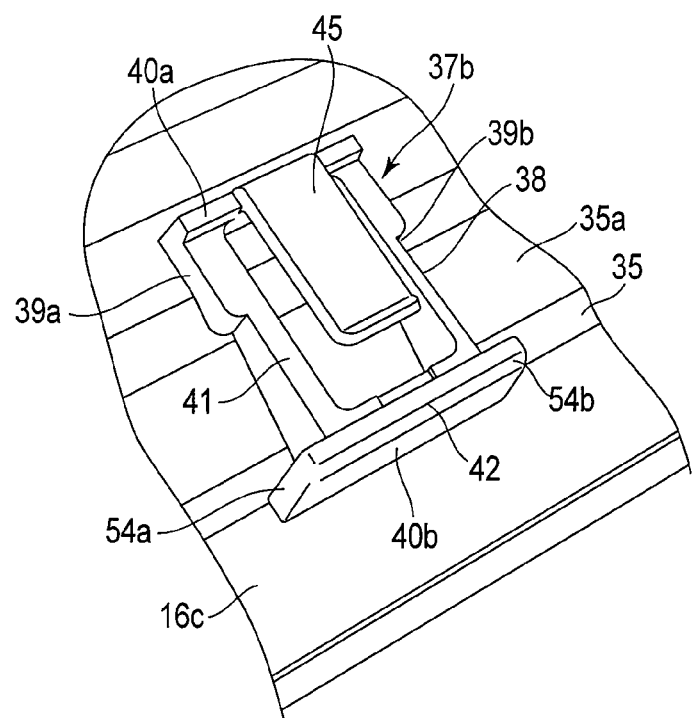
FIG. 16 is an exemplary perspective view showing a state in which the second supporting member is arranged on the third outer peripheral wall of the back chassis.
Figure 17:
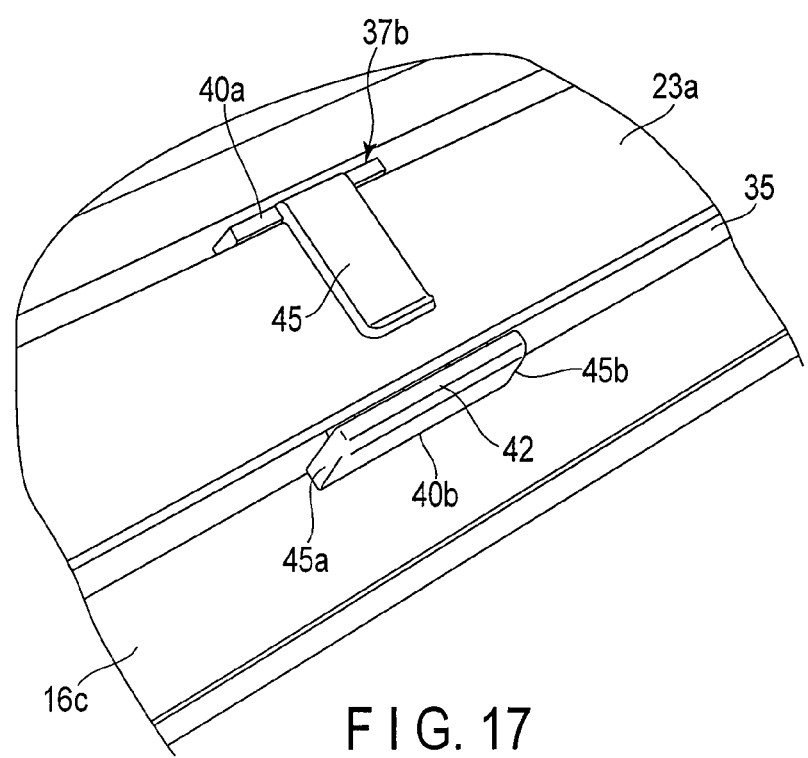
FIG. 17 is an exemplary perspective view showing a state in which the printed-circuit board is held on the third outer peripheral wall of the back chassis via the second supporting member.

As shown in FIGS. 9 and 14, the printed-circuit board 23a is held on the seat 35 of the third outer peripheral wall 16c via first to fifth supporting members 37a, 37b, 37c, 37d, and 37e. The first to fifth supporting members 37a, 37b, 37c, 37d, and 37e are made of a nonconductive synthetic resin material, for example, spaced apart from each other in a longitudinal direction of the printed-circuit board 23a and aligned.

According to the present embodiment, the first, the third, and the fifth supporting members 37a, 37c, 37e receive the printed-circuit board 23a at both ends along a longitudinal direction of the printed-circuit board 23a and an intermediate portion along the longitudinal direction of the printed-circuit board 23a.

Figure 12A:
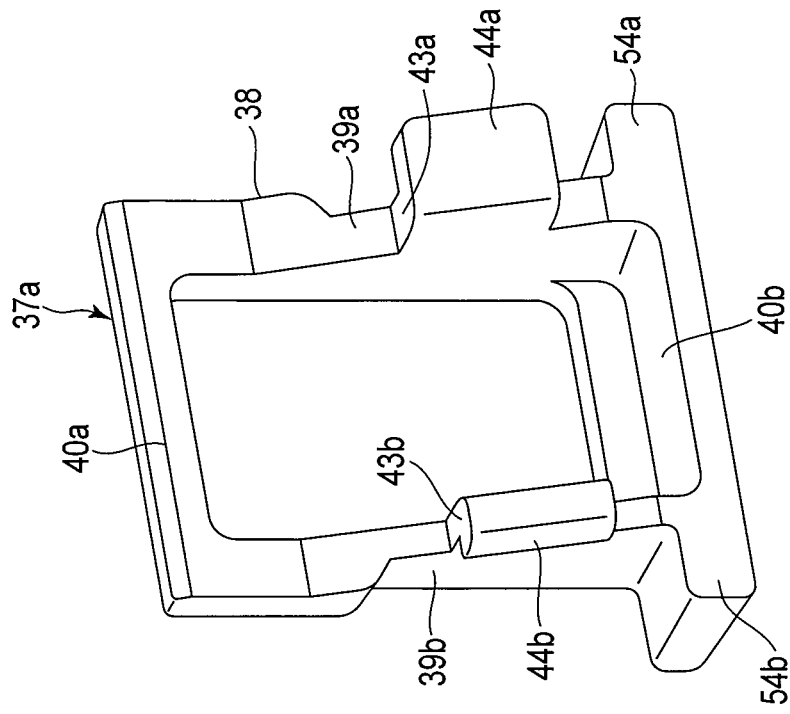
FIG. 12A is an exemplary perspective view of the first supporting member to be used in a first embodiment.
Figure 12B:
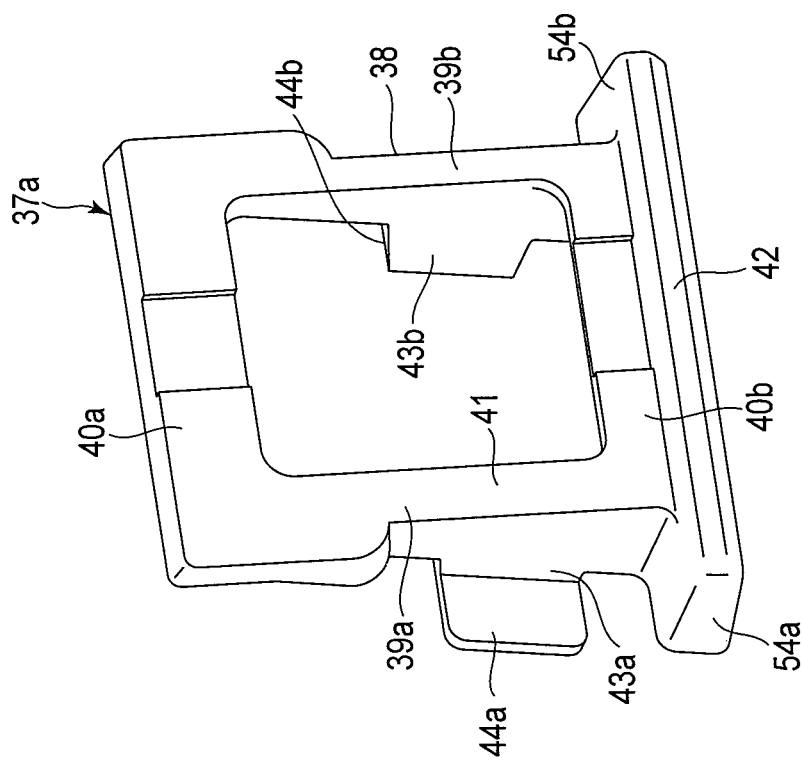
FIG. 12B is an exemplary perspective view of the first supporting member of FIG. 12A seen from the back.

Since the first, the third, and the fifth supporting members 37a, 37c, 37e have a common structure, the first supporting member 37 will be described as a typical example of the supporting members. As shown in FIGS. 10, 12A, and 12B, the first supporting member 37a comprises a receiving portion 38 for receiving the printed-circuit board 23a. The receiving portion 38 is a rectangular frame structured by a pair of longitudinal bars 39a and 39b and a pair of lateral bars 40a and 40b, for example. The receiving portion 38 may be rephrased as a first portion.

The longitudinal bars 39a and 39b are spaced apart from each other in the width direction of the back chassis 11, and arranged in parallel to each other. One of the lateral bars, i.e., the lateral bar 40a, connects between top ends of the longitudinal bars 39a and 39b. The other one of the lateral bars, i.e., the lateral bar 40b, connects between lower ends of the longitudinal bars 39a and 39b. The longitudinal bars 39a and 39b and the lateral bars 40a and 40b cooperate with each other and constitute a flat support surface 41.

Further, the other one of the lateral bars, i.e., the lateral bar 40b comprises a wall 42 which receives a lower edge of the printed-circuit board 23a. The wall 42 extends between the longitudinal bars 39a and 39b, and is projected further than the support surface 41.

As shown in FIGS. 12A and 12B, the longitudinal bars 39a and 39b comprise engagement catches 43a and 43b. The engagement catches 43a and 43b are an example of an engagement portion, and are projected from the lower parts of the longitudinal bars 39a and 39b, respectively, toward the seat 35 of the third outer peripheral wall 16c. Ends 44a and 44b of the engagement catches 43a and 43b are bent in direction in which they become distant from each other.

Meanwhile, the second supporting member 37b receives the printed-circuit board 23a between the first supporting member 37a and the third supporting member 37c, and also holds the printed-circuit board 23a on the seating face 35a. Similarly, the fourth supporting member 37d receives the printed-circuit board 23a between the third supporting member 37c and the fifth supporting member 37e, and also holds the printed-circuit board 23a on the seating face 35a.

The second and fourth supporting members 37b and 37d are different from the first, third and fifth supporting members 37a, 37c, and 37e in that the second and fourth supporting members 37b and 37d each comprise a sandwiching piece 45 for retaining the printed-circuit board 23a. Since structures other than the above have commonality with the structures of the first, third, and fifth supporting members 37a, 37c, and 37e, the same reference numerals will be added to the common structural elements and their detailed explanations will be omitted.

Figure 13A:
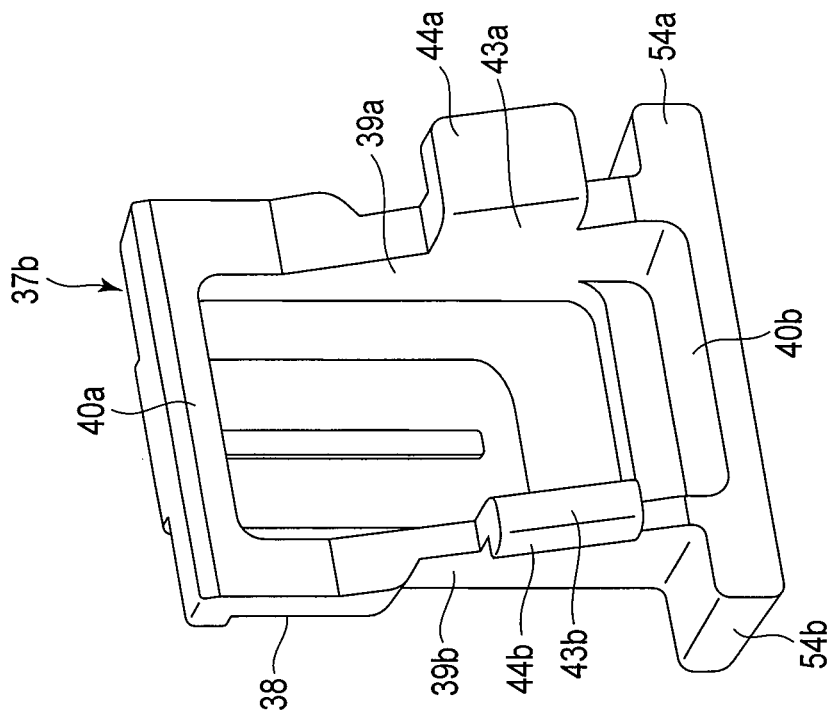
FIG. 13A is an exemplary perspective view of the second supporting member to be used in the first embodiment.
Figure 13B:
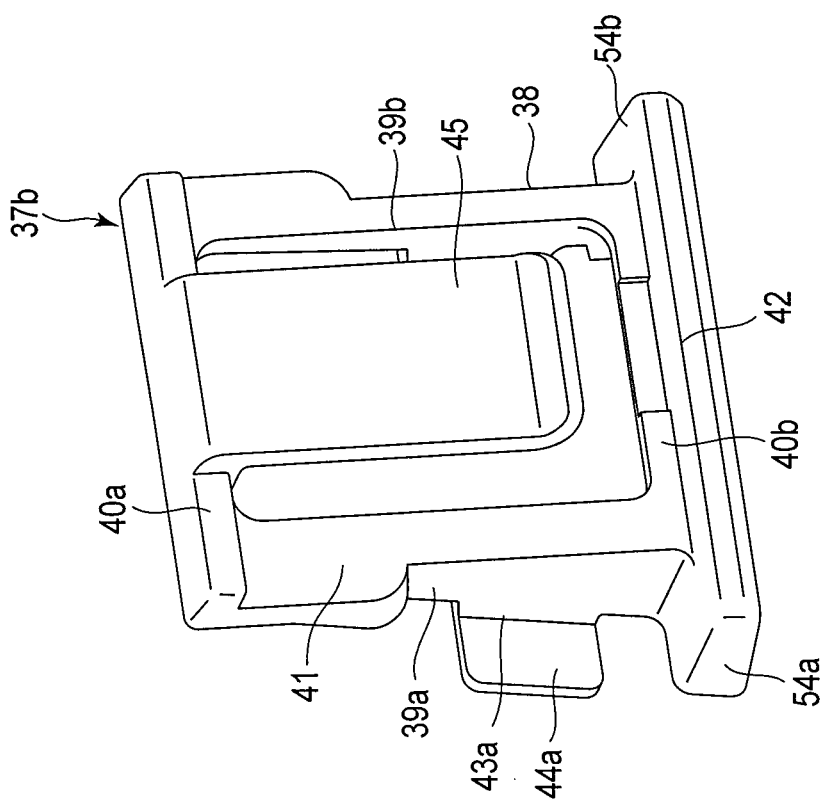
FIG. 13B is an exemplary perspective view of the second supporting member of FIG. 13A seen from the back.

As the second supporting member 37b is illustrated in FIGS. 11, 13A, and 13B as a typical example of the supporting members, the sandwiching piece 45 is integrally formed with one of the lateral bars, i.e., the lateral bar 40a. The sandwiching piece 45 is projected from an intermediate portion of one of the lateral bars, i.e., the lateral bar 40a, toward the other lateral bar, i.e., the lateral bar 40b, and positioned between the longitudinal bars 39a and 39b. The sandwiching piece 45 cooperates with the support surface 41 of the receiving portion 38 so that the printed-circuit board 23a is sandwiched therebetween. The sandwiching piece 45 can be rephrased as a second portion.

Further, the sandwiching piece 45 resiliently contacts the printed-circuit board 23a at a position of avoiding a plurality of circuit elements 51, such as IC chips and connectors, and a conductive grounding gasket 52 mounted on the printed-circuit board 23a.

Accordingly, in the present embodiment, at two places which are separated from each other in a longitudinal direction of the printed-circuit board 23, the printed-circuit board 23a is sandwiched between the second and the fourth supporting members 37b and 37d and the support surface 41, and at three places which are separated from each other in the longitudinal direction, the printed-circuit board 23a is received by the first, the third, and the fifth supporting members 37a, 37c, and 37e.

As shown in FIGS. 7 and 15, in the seat 35 of the third outer peripheral wall 16c, engagement holes 46a and 46b into which the engagement catches 43a and 43b of each of the first to fifth supporting members 37a, 37b, 37c, 37d, and 37e are fitted are formed. The engagement holes 46a and 46b are formed in the seating face 35a of the seat 35, and each of the engagement holes 46a and 46b is shaped as a rectangular opening. The engagement holes 46a and 46b are arranged to be spaced apart from each other in the width direction of the back chassis 11.

Therefore, as is best illustrated in FIG. 7, the seating face 35a of the seat 35 includes five zones 47, each including the engagement holes 46a and 46b aligned. The zones 47 are arranged to be spaced apart from each other in the width direction of the back chassis 11.

Figure 18:
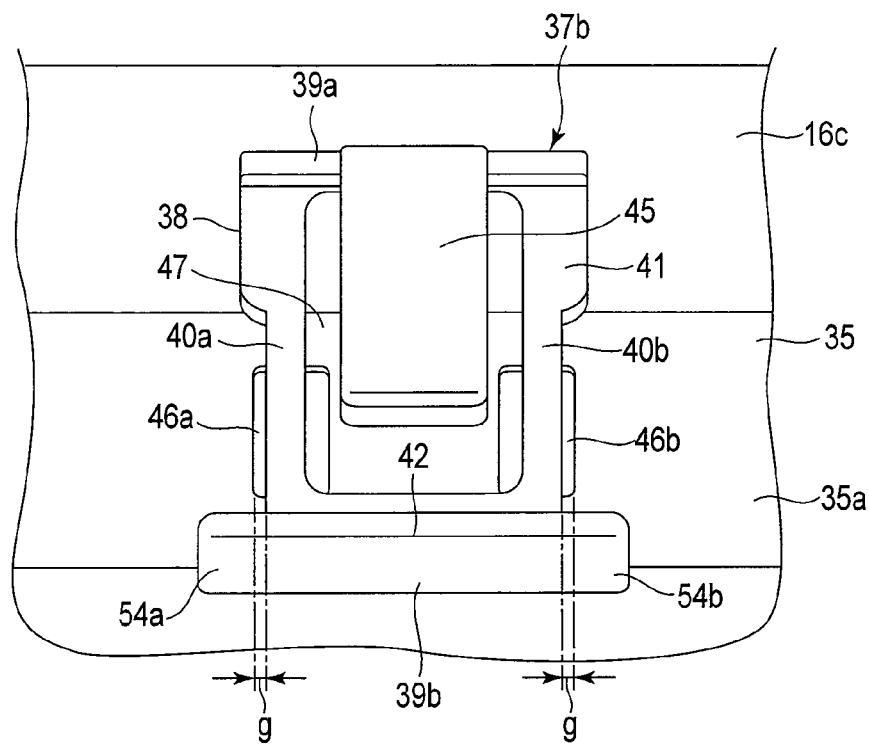
FIG. 18 is an exemplary plan view showing a positional relationship between engagement catches of the second supporting member and the engagement holes formed in the seat of the third outer peripheral wall.

As the second supporting member 37b is illustrated in FIG. 18 as a typical example of the supporting members, the engagement catches 43a and 43b of all of the supporting members 37a, 37b, 37c, 37d, and 37e are inserted into the engagement holes 46a and 46b from the back of third outer peripheral wall 16c. By this insertion, the ends 44a and 44b of the engagement catches 43a and 43b resiliently engage with opening edges of the engagement holes 46a and 46b. Consequently, the receiving portion 38 of each of the supporting members 37a, 37b, 37c, 37d, and 37e is mounted on the third outer peripheral wall 16c such that it extends between the engagement holes 46a and 46b.

As shown in FIG. 10, an edge part on the opposite side of the support surface 41 of the longitudinal frames 39a and 39b abuts on the seating face 35a of the seat 35 while the ends 44a and 44b of the engagement catches 43a and 43b is being engaged with the opening edges of the engagement holes 46a and 46b.

In addition, as shown in FIG. 18, vertically long gap g is formed between the engagement catch 43a and the opening edge of the engagement hole 46a, and between the engagement catch 43b and the opening edge of the engagement hole 46b. Gaps g are provided to allow insertion of the engagement catches 43a and 43b into the engagement holes 46a and 46b, and exposed outside the longitudinal bars 39a and 39b of the receiving portion 38.

While the printed-circuit board 23a is being held on the third outer peripheral wall 16c of the back chassis 11 via the first to fifth supporting members 37a, 37b, 37c, 37d, and 37e, the engagement holes 46a and 46b formed in the seating face 35a of the seat 35 are covered by the printed-circuit board 23a from the back of the back chassis 11.

As FIGS. 12A, 12B, 13A and 13B illustrate the first supporting member 35a and the second supporting member 35b as typical examples of the supporting members, all of the supporting members 37a, 37b, 37c, 37d, and 37e comprise a pair of light-shielding walls 54a and 54b. The light-shielding walls 54a and 54b are an example of a light-shielding portion. The light-shielding walls 54a and 54b are projected in the width direction of the back chassis 11 from both ends of the other one of the lateral bars, i.e., the lateral bar 40b, of the receiving portion 38. Further, they protrude toward the third outer peripheral wall 16c to be contiguous with the wall 42. According to the present embodiment, it can be said in other words that the other one of the lateral bars, i.e., the lateral bar 40b, and the wall 42 connect between the light-shielding walls 54a and 54b.

Figure 19:
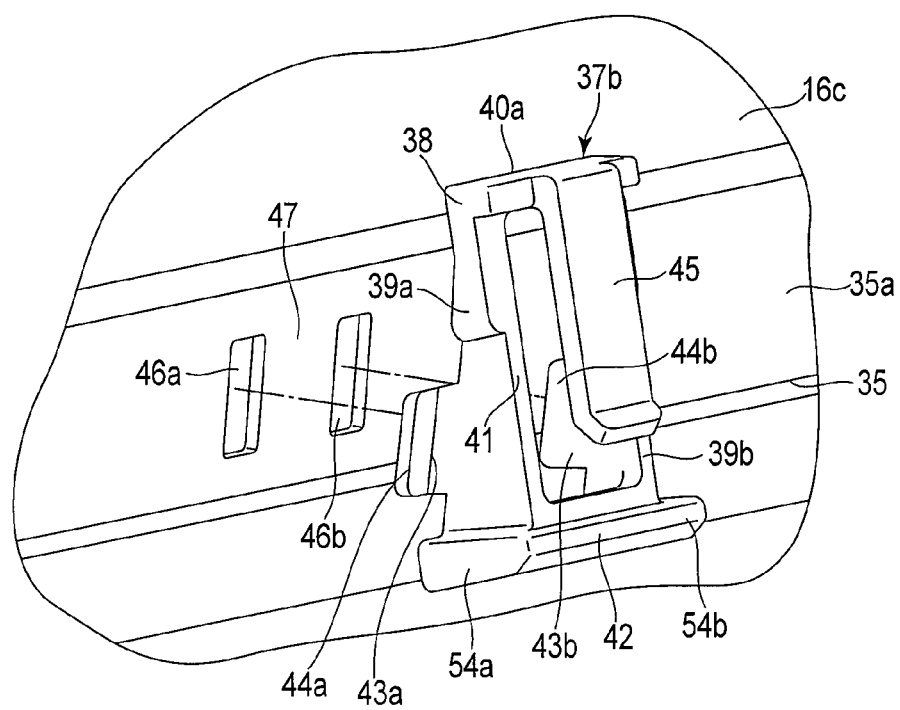
FIG. 19 is an exemplary perspective view showing a positional relationship between the engagement catches of the second supporting member and the engagement holes formed in the seat of the third outer peripheral wall.

Moreover, as shown in FIG. 19, the light-shielding walls 54a and 54b protrude further outwardly along a direction in which the engagement holes 46a and 46b are arranged than each of the zones 47 on the seating face 35a in which a pair of the engagement holes 46a and 46b are arranged. Accordingly, the light-shielding walls 54a and 54b are positioned directly below gaps g produced between the engagement catch 43a and the opening edge of the engagement hole 46a and between the engagement catch 43b and the opening edge of the engagement hole 46b, respectively. In addition to that, the light-shielding walls 54a and 54b are shaped to be larger than width dimensions of gaps g when the back chassis 11 is seen from the back.

Figure 5:
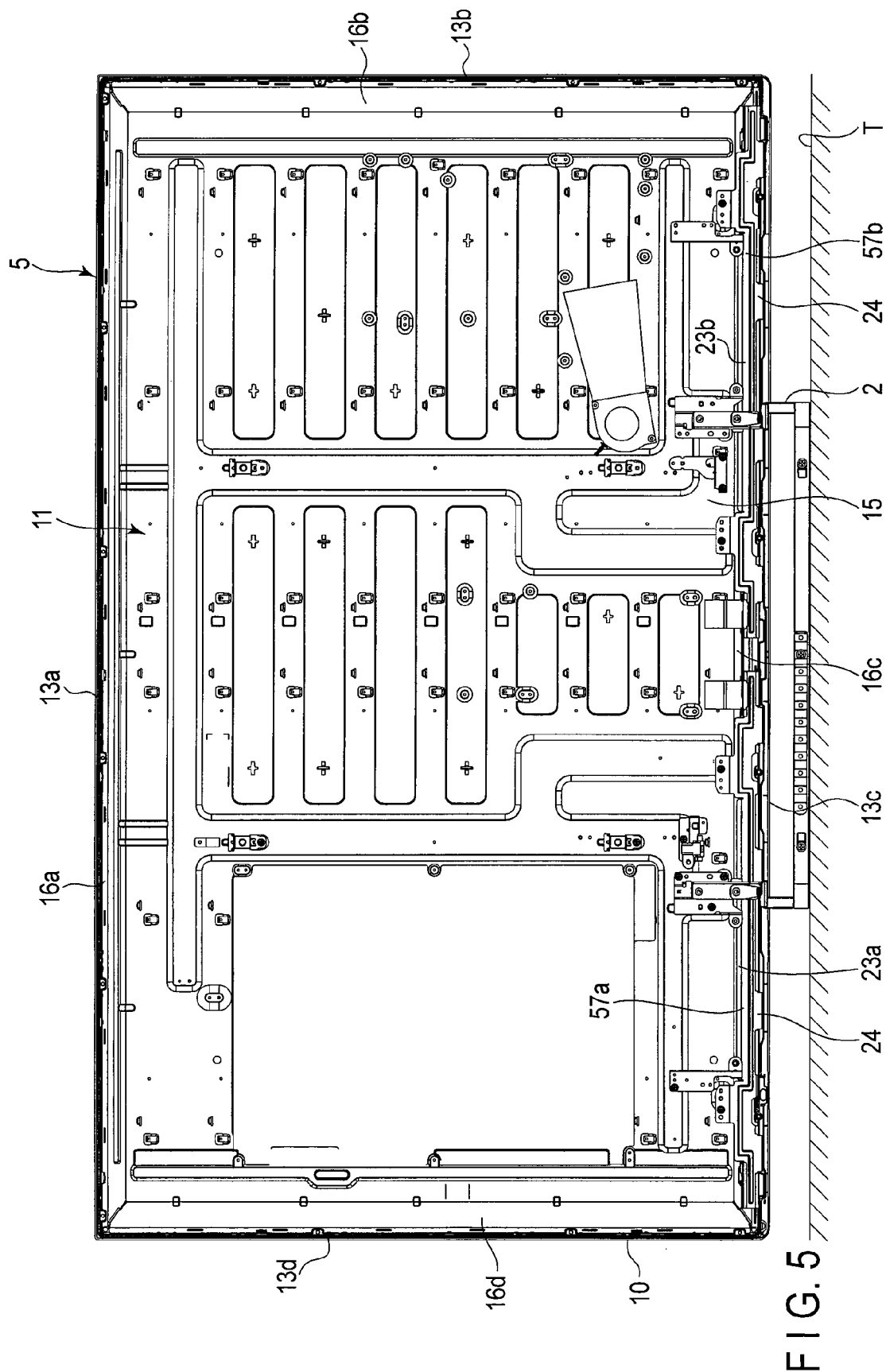
FIG. 5 is an exemplary back view of a back chassis.

As shown in FIGS. 5, 10, and 11, a pair of metallic shield boards 57a and 57b are fixed to the back wall 15 of the back chassis 11 by a plurality of screws. The shield boards 57a and 57b cover the printed-circuit boards 23a and 23b, respectively, from the back of the back chassis 11, and are resiliently pressed against the grounding gaskets 52 mounted on their respective printed-circuit boards 23a and 23b.

Consequently, the printed-circuit boards 23a and 23b are pressed in a direction of approaching the third outer peripheral wall 16c of the back chassis 11 by the shield boards 23a and 23b, and received by the receiving portions 38 of the first to fifth supporting members 37a, 37b, 37c, 37d, and 37e. The receiving portions 38 are interposed between the third outer peripheral wall 16c of the back chassis 11 and the printed-circuit boards 23a and 23b, and electrically insulate the third outer peripheral wall 16c of the back chassis 11 from the printed-circuit boards 23a and 23b.

As one of the shield boards, i.e., the shield board 57a, is illustrated in FIGS. 10 and 11 as a typical example of the shield boards, a lower edge portion of the shield board 57a is distant from the third outer peripheral wall 16c of the back chassis 11. A gap between the lower edge portion of the shield board 57a and the front edge portion of the third outer peripheral wall 16c is used as a path for passing the flexible printed wiring boards 24 therethrough. Consequently, the printed-circuit board 23a held on the third outer peripheral wall 16c is exposed at the lower side of the back chassis 11 from the gap between the lower edge portion of the shield board 57a and the third outer peripheral wall 16c.

Further, according to the present embodiment, in the shield board 57a, a front surface which faces the printed-circuit board 23a is covered by a light reflection sheet 58.

The unit cover 8 is made of a synthetic resin material, for example. The unit cover 8 is assembled with the housing 5 in such a way that the back chassis 11 is covered from the back. The printed-circuit boards 23 and 23b, the flexible printed wiring boards 24, and the printed-wiring board 32 located behind the back chassis 11 are covered by the unit cover 8. Accordingly, the unit cover 8 can be treated as a part of elements which constitute the housing 5.

As shown in FIG. 2, the unit cover 8 comprises a lower wall 60. The lower wall 60 is an example of a peripheral wall of the housing 5, and covers a gap between the third outer peripheral wall 16c of the back chassis 11 and the lower edge portions of the shield boards 57a and 57b from the bottom. Further, the lower wall 60 faces top board T of the television plinth.

The lower wall 60 comprises a pair of openings 62a and 62b that emit sound produced by a pair of speakers 61a and 61b, and a plurality of air vents 63 for enhancing the heat discharge performance in the housing 5. Each of the openings 62a and 62b and the air vents 63 is an example of a through-hole, and the openings 62a and 62b and the air vents 63 communicate with a region in which the printed-circuit boards 23a and 23b are held through the gap between the lower edge portions of the shield boards 57a and 57b and the third outer peripheral wall 16c of the back chassis 11.

Consequently, the light-shielding walls 54a and 54b of each of the first to fifth supporting members 37a, 37b, 37c, 37d, and 37e are projected from the receiving portion 38 of each of the first to fifth supporting members 37a, 37b, 37c, 37d, and 37e such that they thrust into space between the lower wall 60 of the unit cover 8 and gaps g, which are formed between the engagement catch 43a and the opening edge of the engagement hole 46a and between the engagement catch 43b and the opening edge of the engagement hole 46b, respectively.

According to the first embodiment, in the third outer peripheral wall 16c of the back chassis 11 located behind the liquid crystal panel 6 and the LED modules 28, a plurality of engagement holes 46a and 46b for arranging the first to fifth supporting members 37a, 37b, 37c, 37d, and 37e are formed. For this reason, it is possible that a part of light emitted by the LED modules 28 will leak to the back and the bottom of the back chassis 11 through the engagement holes 46a and 46b.

However, in the first embodiment, the engagement holes 46a and 46b are covered from the back of the back chassis 11 by the printed-circuit boards 23a and 23b received by the receiving portions 38 of the first to fifth supporting members 37a, 37b, 37c, 37d, and 38e. Further, the light-shielding walls 54a and 54b formed integrally with the receiving portions 38 are positioned directly below gaps g formed between the engagement catch 43a and the engagement hole 46a and between the engagement catch 43b and the engagement hole 46b, respectively.

Consequently, the light directed toward the back of the back chassis 11 passing through the engagement holes 46a and 46b is blocked off by the printed-circuit boards 23a and 23b. In addition, the light directed toward the lower part of the back chassis 11 which comes out through the gaps g is blocked off by the light-shielding walls 54a and 54b.

Accordingly, the light emitted from the LED modules 28 can be prevented from leaking from engagement holes 46a and 46b of the back chassis 11. Further, although the openings 62a and 62b for emitting sound and the air vents 63a are provided in the lower wall 60 of the unit cover 8, it is possible to prevent the light from leaking from here.

Thus, by utilizing the first to fifth supporting members 37a, 37b, 37c, 37d, and 37e for holding the printed-circuit boards 23a and 23b on the back chassis 11, it is possible to resolve light leakage from the television main body 3, and omit an exclusive light-shielding member.

Further, according to the first embodiment, by providing the light-shielding walls 54a and 54b on the receiving portion 38 of each of the first to fifth supporting members 37a, 37b, 37c, 37d, and 37e, it is possible to reasonably secure gaps g for allowing insertion of the engagement catches 43a and 43b through space between the engagement catches 43a and 43b and the opening edges of the engagement holes 46a and 46b. Accordingly, the first to fifth supporting members 37a, 37b, 37c, 37d, and 37e can be held on the back chassis 11 by mere mechanical engagement, and the workability in assembling the liquid crystal television 1 can be improved.

In addition, by securing gaps g, it is possible to facilitate the work of engaging the engagement catches 43a and 43b with the opening edges of the engagement holes 46a and 46b and disengaging the same. That is, the workability in attaching the first to fifth supporting members 37a, 37b, 37c, 37d, and 37e on the back chassis 11 and vice versa, disengaging the first to fifth supporting members 37a, 37b, 37c, 37d, and 37e from the back chassis 11, is improved.

Second Embodiment

FIG. 20 discloses a second embodiment.

The second embodiment is different from the first embodiment in that the form of a receiving portion 38 of each of first to fifth supporting members 37a, 37b, 37c, 37d, and 37e is different, and structures other than the above are similar to those of the first embodiment. In the second embodiment, a second supporting member 37b will be described as a typical example of the supporting members.

As shown in FIG. 20, a wall 42 of the second supporting member 37b is cut out between a longitudinal bar 39a and a longitudinal bar 39b. That is, a recessed portion 71 indented toward a lateral bar 40b is formed in the wall 42. In the presence of the recessed portion 71, the wall 42 which contacts lower edges of printed-circuit boards 23a and 23b is separated into a first end portion 72a and a second end portion 72b. The first end portion 72a is contiguous with one of light-shielding walls, i.e., a light-shielding wall 54a, and the second end portion 72b is contiguous with the other light-shielding wall, i.e., a light-shielding wall 54b.

Also in the second embodiment as described above, light leakage from engagement holes 46a and 46b can be prevented by the receiving portion 38 of each of the first to fifth supporting members 37a, 37b, 37c, 37d, and 37e.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the first embodiment, the sandwiching piece 45 for sandwiching each of the printed-circuit boards 23a and 23b is provided for only the second and the fourth supporting members 37b and 37d. However, elements for which such a sandwiching piece is provided are not limited to above. For example, a similar sandwiching piece 45 may be provided for the first, third, and fifth supporting members 37a, 37c, and 37e as well, so that the printed-circuit boards 23a and 23b are held by all of the supporting members 37a, 37b, 37c, 37d, and 37e.

Further, a circuit component to be held on a back chassis is not specified to a printed-circuit board, and may be a wire harness of bundled cables, for example.

What is claimed is:
1. An image display device comprising:
a light-emitting module;
a housing comprising a back chassis covering the light-emitting module, and accommodating the light-emitting module;
a cover provided in the housing to cover the back chassis and comprising a through-hole;
a circuit component located between the back chassis and the cover; and
a supporting member configured to hold the circuit component on the back chassis, the supporting member attached to an engagement hole formed in the back chassis and located between the back chassis and the circuit component,
wherein the supporting member comprises a receiving portion which receives the circuit component, and a light-shielding portion which blocks off light of the light-emitting module passing through the engagement hole in the back chassis.
2. The image display device of claim 1, wherein the supporting member comprises an engagement portion engaged with the engagement hole in the back chassis, a gap exposed outside the supporting member is formed between the engagement portion and an opening edge of the engagement hole, and the light-shielding portion is provided on the receiving portion such that the light-shielding portion thrusts into space between the gap and the housing.
3. The image display device of claim 2, wherein the light-shielding portion is shaped to be larger than a dimension of the gap.

4. The image display device of claim 1, wherein the supporting member comprises a sandwiching piece which cooperates with the receiving portion to sandwich the circuit component.

5. The image display device of claim 4, wherein the circuit component is opposed to the engagement hole while the circuit component is being held on the back chassis via the supporting member.

6. The image display device of claim 1, wherein the circuit component comprises a printed-circuit board, the receiving portion of the supporting member comprises a wall which is in contact with an edge of the printed-circuit board, and the light-shielding portion is provided to be contiguous with the wall.

7. An image display device comprising:
a panel configured to display an image;
a light source configured to illuminate the panel;
a housing comprising a back chassis, the back chassis covering the panel and the light source and including a plurality of engagement holes which are spaced apart from each other, the housing accommodating the panel and the light source;
a cover provided in the housing to cover the back chassis and comprising a through-hole;
a circuit component located between the back chassis and the cover; and
a supporting member configured to hold the circuit component on the back chassis, the supporting member attached to the back chassis such that the supporting member extends between the engagement hole and located between the back chassis and the circuit component,
wherein the supporting member comprises a receiving portion which receives the circuit component and a plurality of light-shielding portions provided on the receiving portion, the light-shielding portions blocking off light of the light source passing through the engagement holes by protruding further outwardly along a direction in which the engagement holes are arranged than a zone of the back chassis in which the engagement holes are arranged.

8. The image display device of claim 7, wherein the supporting member comprises a plurality of engagement portions which are engaged with the engagement holes of the back chassis, respectively, gaps exposed outside the supporting member are formed between the engagement portions and opening edges of the engagement holes, and the light-shielding portion is configured to block off light directed toward the housing through the gaps.

9. The image display device of claim 8, wherein the circuit component comprises a printed-circuit board, the receiving portion of the supporting member comprises a wall which is in contact with an edge of the printed-circuit board, and the light-shielding portions are provided to be contiguous with the wall.

10. The image display device of claim 9, wherein the wall is configured to connect between the light-shielding portions.

11. The image display device of claim 10, wherein the circuit component is opposed to the engagement holes while the circuit component is being held on the back chassis via the supporting member.

12. The image display device of claim 7, wherein the supporting member comprises a sandwiching piece which cooperates with the receiving portion to sandwich the circuit component.

* * * * *